(12) United States Patent
Cooper et al.

(10) Patent No.: US 10,855,768 B2
(45) Date of Patent: Dec. 1, 2020

(54) METHOD AND SYSTEM FOR VEHICLE COMMUNICATIONS

(71) Applicant: Transportation IP Holdings, LLP, Norwalk, CT (US)

(72) Inventors: Jared Klineman Cooper, Palm Bay, FL (US); John Brand, Flower Mound, TX (US); Todd William Goodermuth, Melbourne, FL (US); Scott Nelson, Melbourne, FL (US); Joseph Forrest Noffsinger, Grain Valley, MO (US); Nick David Nagrodsky, Melbourne, FL (US); Aaron Richard Mitti, Atlanta, GA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/185,962

(22) Filed: Nov. 9, 2018

(65) Prior Publication Data

US 2019/0082011 A1    Mar. 14, 2019

Related U.S. Application Data

(63) Continuation of application No. 14/246,619, filed on Apr. 7, 2014, now Pat. No. 10,469,579, which is a continuation-in-part of application No. 12/969,702, filed on Dec. 16, 2010, now Pat. No. 8,719,382.

(51) Int. Cl.
*H04L 15/16* (2006.01)
*H04L 29/08* (2006.01)
*B61C 17/12* (2006.01)

(52) U.S. Cl.
CPC .......... *H04L 67/1097* (2013.01); *B61C 17/12* (2013.01); *H04L 67/12* (2013.01)

(58) Field of Classification Search
CPC ... H04L 67/12; H04L 67/1097; H04L 65/604; H04L 65/104; H04L 65/4069; B61C 17/12; H04N 19/34; H04N 19/36; H04N 19/59; H04N 19/167
USPC ................................ 709/217–219, 225–229
See application file for complete search history.

(56) References Cited

U.S. PATENT DOCUMENTS

| | | | |
|---|---|---|---|
| 4,455,483 A | 6/1984 | Schönhuber | |
| 5,673,039 A | 9/1997 | Pietzsch et al. | |
| 6,754,369 B1* | 6/2004 | Sazawa | G06K 9/3266 382/105 |
| 7,054,552 B2* | 5/2006 | Konttinen | G03B 17/18 348/239 |
| 8,127,035 B1* | 2/2012 | Hood | G06Q 10/107 709/227 |
| 8,447,804 B2 | 5/2013 | Bai et al. | |
| 8,484,045 B1 | 7/2013 | Fernandez et al. | |
| 8,655,517 B2 | 2/2014 | Brand et al. | |

(Continued)

OTHER PUBLICATIONS

Australian Patent Office, Examination Report Issued in Application No. 2015201740, dated Jun. 4, 2018, 1 pages.

*Primary Examiner* — Bharat Barot
(74) *Attorney, Agent, or Firm* — McCoy Russell LLP

(57) ABSTRACT

Methods and systems are provided for processing data generated in a vehicle group. One example embodiment comprises selectively off-boarding a data set generated at a first vehicle in the vehicle group for storage purposes, the first data set off-boarded to one or more of a second vehicle in the vehicle group and a remote storage device.

11 Claims, 5 Drawing Sheets

(56) References Cited

U.S. PATENT DOCUMENTS

| | | | |
|---|---|---|---|
| 8,982,944 B2* | 3/2015 | Vanman | H04N 19/59 |
| | | | 348/568 |
| 9,667,879 B1* | 5/2017 | Goyal | H04N 5/2353 |
| 9,794,311 B2* | 10/2017 | Mao | H04L 65/604 |
| 9,883,209 B2 | 1/2018 | Ricci | |
| 10,313,417 B2* | 6/2019 | Chen | H04N 19/33 |
| 10,469,579 B2* | 11/2019 | Cooper | H04L 67/1097 |
| 2002/0049535 A1 | 4/2002 | Rigo et al. | |
| 2002/0101509 A1 | 8/2002 | Slomski | |
| 2004/0039497 A1* | 2/2004 | Wood | G06Q 10/06 |
| | | | 701/4 |
| 2004/0230373 A1 | 11/2004 | Tzamaloukas | |
| 2005/0198313 A1 | 9/2005 | Branigan et al. | |
| 2005/0253926 A1 | 11/2005 | Chung et al. | |
| 2005/0273473 A1* | 12/2005 | Grace | H04L 67/1095 |
| 2006/0095193 A1 | 5/2006 | Nishira et al. | |
| 2006/0229980 A1 | 10/2006 | Habaguchi | |
| 2007/0219685 A1 | 9/2007 | Plante | |
| 2008/0065286 A1 | 3/2008 | Han et al. | |
| 2010/0256836 A1 | 10/2010 | Mudalige | |
| 2011/0225269 A1 | 9/2011 | Yap et al. | |
| 2013/0250933 A1 | 9/2013 | Yousefi et al. | |
| 2013/0279500 A1 | 10/2013 | Yousefi et al. | |
| 2018/0270486 A1* | 9/2018 | Liu | H04L 65/604 |

* cited by examiner

METHOD AND SYSTEM FOR VEHICLE COMMUNICATIONS

CROSS REFERENCE TO RELATED APPLICATIONS

The present application is a continuation of U.S. Non-Provisional patent application Ser. No. 14/246,619, entitled "METHOD AND SYSTEM FOR DATA PROCESSING IN A VEHICLE GROUP," and filed on Apr. 7, 2014. U.S. Non-Provisional patent application Ser. No. 14/246,619 is a continuation-in-part of U.S. Non-Provisional patent application Ser. No. 12/969,702, entitled "METHOD AND SYSTEM FOR DATA PROCESSING," and filed on Dec. 16, 2010, now U.S. Pat. No. 8,719,382. The entire contents of each of the above-listed applications are hereby incorporated by reference for all purposes.

BACKGROUND

The subject matter disclosed herein relates to a method and system for processing data. In one embodiment, the data may be selectively processed with reference to a data parameter, such as video data quality.

DISCUSSION OF ART

Vehicle groups can include a lead vehicle and a remote or trailing vehicle. Each vehicle can include a data gathering device or sensor. One such device can be a camera system with a video device (e.g., video camera) to capture video and/or audio data.

The collected data volume may be large and unwieldy. To address the volume, it may be sometimes desirable to transmit and store the data in storage capacity that is located off-board the vehicle on which the data is being collected Further, it may be desirable to store the data in an environment protected from degradation that may occur due to ambient conditions.

BRIEF DESCRIPTION

Methods and systems are provided for processing data in a vehicle group. One example embodiment comprises a method of processing data in a vehicle group, comprising selectively off-boarding a data set generated at a first vehicle in the vehicle group for storage purposes, the first data set off-boarded to one or more of a second vehicle in the vehicle group and a remote storage device.

In one embodiment, the vehicle group is a consist including a plurality of rail vehicles (e.g., locomotives). Therein, a first rail vehicle may include a first data capture device for generating a first data set at the first rail vehicle, while a second rail vehicle includes a second data capture device for generating a second, different data set at the second rail vehicle. Based on an evaluation of one or more quality parameters of the first data set, the first data set is off-boarded from the first vehicle for storage purposes. For example, when the quality of the first data set is higher than a threshold, the first data set is off-boarded to, and stored on, a data storage device of the second vehicle. In comparison, when the quality of the first data set is lower than the threshold, the first data set is not stored on the second vehicle. Instead, the second data set generated at the second vehicle is stored at the second vehicle. It will be appreciated that the first data set may be similarly, and simultaneously, transmitted to each rail vehicle in the consist, and based on the evaluation, redundantly stored on each rail vehicle. Further, the first data set may also be stored on the first rail vehicle.

In this way, the large volume of data captured on a vehicle of a vehicle group can be off-boarded from the vehicle on which it was captured, thereby reducing issues related to storage capacity. Additionally, when the captured data is of a significant nature, the data can be redundantly stored at multiple locations. By off-boarding data based on one or more assessed quality parameters of the captured data, only effectual data is stored, and the storage capacity of a data storage device is not filled with ineffectual data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Vehicles may travel in groups, wherein one vehicle in the group may be designated as a lead vehicle and another as a remote vehicle based on, for example, the direction of travel of the group. By way of example, in a rail setting, a consist consisting of several locomotives may be grouped together. Other examples may include independently-controlled vehicles, such as a convoy of semi-tractor trailers on a highway, and dependently-controlled vehicles, such as off-highway mining dump trucks that are remotely controlled or controlled by autonomous systems.

Figure 1:
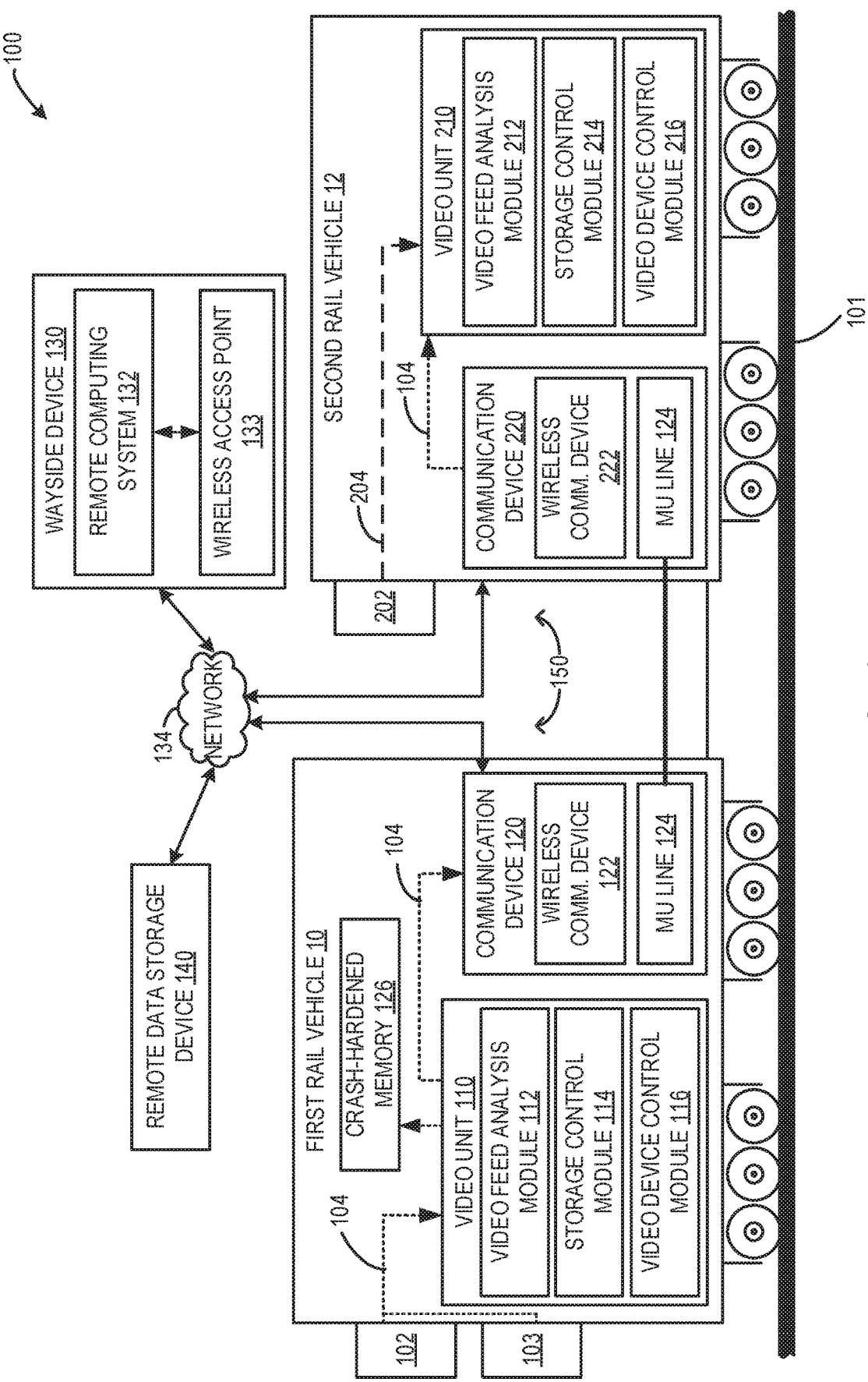
FIG. 1 shows an example embodiment of a vehicle group including a plurality of vehicles configured with respective data capture devices.
Figure 2:
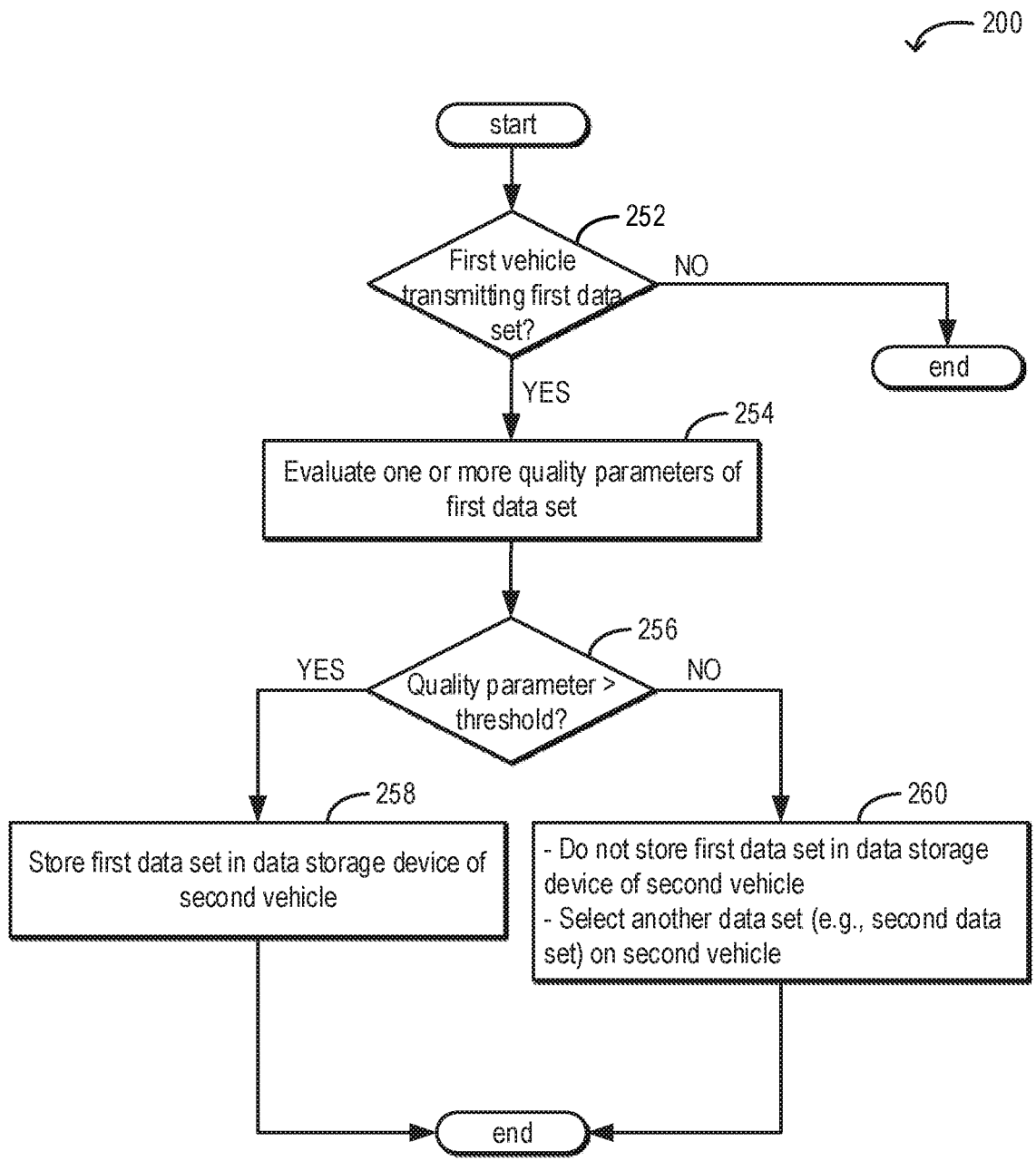
FIG. 2 shows a high level flow chart of a method for controlling data generation on a vehicle group, and off-board storage of the generated data, based on a quality parameter of the data.

One embodiment of a vehicle group is illustrated in FIG. 1, wherein a train system includes a first, lead vehicle and a second, remote vehicle. The vehicles include respective data capture devices for capturing data, such as audio-visual information, during vehicle operation. The respective data capture devices are in communication with respective video units, or data storage devices, and respective controllers operable to control storage and transmission of the data generated on the vehicle group. As shown in FIG. 2, a controller associated with the data capture device of the second vehicle is configured to receive data generated on, and transmitted from, the first vehicle. Based on an evaluation of one or more quality parameters of the transmitted data, such as based on file size and/or frame size variations of the data set (as elaborated in FIG. 3), the transmitted data may be off-boarded for storage purposes. For example, if the transmitted data is of a high quality, the transmitted data is off-boarded and stored as back-up storage on the second vehicle. In comparison, if the transmitted data is of a low quality, an alternate data set is selected for storage on the second vehicle, such as native data captured on the second vehicle. In this way, data generated by a vehicle group is better managed, and significant data transmitted from a lead vehicle is redundantly stored on one or more remote vehicles only if the transmitted data is of a suitable quality.

FIG. 1 is a schematic diagram of an example embodiment of a vehicle group system, herein depicted as consist 100, configured to travel on track 101. Consist 100 includes a plurality of vehicles configured to travel in a vehicle group. Based on a configuration of the vehicle group (e.g., based on a direction of travel, or based on a power distribution profile), one vehicle in the vehicle group is designated as a lead vehicle while the remaining vehicles are designated as remote vehicles. In the depicted example, consist 100 includes a first, lead vehicle 10 and a second, remote vehicle 12. The first vehicle 10 and the second vehicle 12 represent vehicles that provide tractive effort to propel consist 100. In one example, the plurality of vehicles are diesel-electric vehicles that each include a diesel engine (not shown) that generates a torque output that is converted to electricity by an alternator (not shown) for subsequent propagation to a variety of downstream electrical components, such as a plurality of traction motors (not shown) to provide tractive power to propel consist 100. While the depicted example shows the second vehicle 12 in a back-to-back configuration with the first vehicle 10, it will be appreciated that in an alternate embodiment, the second vehicle 12 may be in a nose-to-tail configuration with the first vehicle 10.

Although only two vehicles are depicted, it will be appreciated that consist 100 may include more than two vehicles. Furthermore, consist 100 may include rolling stock that does not provide power to propel the consist. For example, the first lead vehicle 10 and the second remote vehicle 12 may be separated by a plurality of units (e.g., passenger or freight cars) that do not provide propulsion. On the other hand, every unit in the vehicle group may include propulsive system components that are controllable from a single location.

First vehicle 10 is configured with a first data capture device 102 for generating a first data set 104 (dotted arrow) by capturing audio and/or visual information, as well as locomotive parameter information, at the first vehicle. Similarly, second vehicle 12 is configured with a second data capture device 202 for generating a second data set 204 (dashed arrow) by capturing audio and visual information, as well as locomotive parameter information, at the second vehicle. In some examples, first vehicle 10 is configured with a third data capture device 103 for generating a third data set. The third data set captured by the third data capture device 103 may be substantially similar to the first data set, in order to generate a redundant data set. As explained in more detail below, if one of the first or third data sets is determined to be of low quality, the low quality data set may be dispensed with, and the higher quality data set may be stored on and/or off-board the first vehicle.

Based on the operating environment of the train consist, first, second, and/or third data capture device 102, 202, 103 may be designed to withstand harsh operating environments. In one example, first, second, and third data capture device 102, 202, 103 may include components such as a video camera and an audio recorder for capturing video and audio data. In one example, the video camera may be configured to capture video data in the visible spectrum, performing even at very low lumens. In still other examples, the video camera may be configured to capture video data in infra-red or other spectra.

Each of first data set 104 and second data set 204 captured by the first and second data capture devices (and third data set, when the third data capture device is present) may include, for example, video data from outside of the vehicle, audio data from outside of the vehicle, data from inside a vehicle cabin (e.g., vehicle operator cabin), etc. For example, the first data capture device 102 may include one or more of an inward-facing camera to capture video information from inside the first vehicle, an outward-facing camera to capture video information from outside the first vehicle, and one or more microphones for capturing audio information. The captured data may also provide information regarding vehicle operating conditions (e.g., vehicle speed, direction of travel, time of travel, location, weather conditions along route, track conditions, etc.) as well as information regarding vehicle components (e.g., whether vehicle lights, horns, bells, etc. are on or off). The captured data may include a time-stamp, a scale-stamp, encryption data, a temperature-stamp, etc. As an example, based on a time-stamp on the captured data, a time of travel, speed of travel, distance covered, etc., may be determined. The scale-stamp on the data may vary responsive to a lens position of the camera, amount of zoom used, autofocus configurations, etc. The scale-stamp may also be used to determine the distance travelled. The encryption data may include identification code identifying the device generating the data (e.g., serial number, make, model, position of device) as well as the vehicle (e.g., location in consist, make, model, fleet, owning authority, etc.) on which the data is being generated. The temperature-stamp may indicate the ambient temperature of a region the consist is travelling through. Data generated by the first and/or second data capture device may be advantageously used to audit crossing equipment, inspect rights-of-way, train crews, and the like.

A first controller is coupled to the first data capture device 102 and third data capture device 103 for initiating transmission of the first data set 104 captured by the first data capture device 102 off-board the first vehicle 10. First vehicle 10 further includes a first data storage device operable to store the first data set, or an alternate data set. In some embodiments, as depicted, the first controller and the first data storage device of the first vehicle are configured into a single unit, herein first video unit 110. In the depicted example, first video unit 110 includes a storage control module 114 configured to store the first data set 104 in electronic storage on the first vehicle. Storage control module 114 may include hardware and/or software for storing the first data set 104. In one example, first data set 104 is stored on the first rail vehicle as primary data storage, and stored off-board the first vehicle as redundant data storage. Herein, first data set can be stored in the primary storage location as a higher resolution data, while the first data set is stored in the redundant storage location as a lower resolution data. However, in alternate embodiments, such as where the first data set is stored off-board only, the first data set may always be stored as higher resolution data.

First video unit 110 may, optionally, further include a video feed analysis module 112 for analyzing a quality parameter of the first data set 104 generated by the first data capture device 102 at the first vehicle, as well as a video device control module 116 for controlling the first data capture device 102. When included, video feed analysis module 112 may evaluate a quality parameter of first data set 104 at the first vehicle before first data set 104 is transmitted from the first vehicle 10. Accordingly, in one embodiment, the first data set 104 is transmitted from the first vehicle 10 to one or more remote vehicles, such as second vehicle 12, only if the quality parameter of the first data set is higher than a threshold. As further elaborated with reference to FIGS. 2-4, based on an evaluation of the quality parameter of the first data set, the first data set may be off-boarded from the first vehicle 10 for storage purposes. Video feed analysis module 112 may include hardware and/or software configured to analyze and evaluate one or more quality parameters of the first data set. Similarly, video device control module 116 may include hardware and/or software configured to control first data capture device 102.

While the depicted example shows first data capture device 102 coupled to a first video unit 110, in alternate embodiments, the first controller (e.g., an on-board control system) may be coupled to the first data capture device 102, the controller including code for evaluating a quality parameter of the first data set before transmission, code for transmitting the first data set from the first vehicle 10 to the second vehicle 12 based on the evaluation, as well as code for recording the transmitted first data set 104 on the first vehicle (for example, on a dedicated first data storage device).

In some examples, first vehicle 10 may include an additional data storage device, separate from the storage control module 114. The additional data storage device, referred to as a crash-hardened memory 126, may include hardware and/or software for storing the first data set and/or additional or alternative data sets. The crash-hardened memory 126 may be tamper-resistant and adapted to withstand fire, impact forces, liquid immersion, and other conditions that may arise due to catastrophic ambient conditions, such as a crash of the vehicle group. The crash-hardened memory 126 may be adapted to store (e.g., record) data related to operating conditions of the first vehicle for analysis in the event of a crash of the first vehicle. The stored data may include the first data set generated by the first and/or third data capture device.

The crash-hardened memory 126 may be a smaller storage device than the standard data storage device present on the first vehicle 10 (e.g., the storage control module 114). As such, in some examples, the quality level of the data sets generated by the first and/or third capture devices may be evaluated and only high-quality data (e.g., data having a threshold resolution, signal-to-noise ratio, etc.) may be stored on the crash-hardened memory 126. For example, data having a resolution, signal-to-noise ratio, etc., below a threshold may not be saved on the crash-hardened memory 126. Lower quality data may be stored on the storage device of the storage control module 114 or another standard data storage device on or off board the first vehicle, as will be explained in more detail below with respect to FIG. 4. Further, in some examples, the data sets generated by the first and/or third data capture device may be cropped, compressed, pared, or otherwise modified in order to reduce the file size prior to storage. The portions of the data sets that are removed during the cropping, paring, compressing, etc., may not be stored but instead may be discarded. Thus, only the high-quality, and in some cases compressed, data may be saved on the crash-hardened memory.

First data set 104 captured by first data capture device 102 is broadcast on a display (not shown) in the first vehicle 10. In one example, the display and the first video unit 110 are housed within a locomotive cab of the first vehicle to provide easy access to locomotive operating crew. A communication system 150 is configured to communicatively couple first vehicle 10 to other vehicles of the vehicle group, including second vehicle 12. Communication system 150 is linked to a network 134, and is further configured to couple each vehicle of the vehicle group to a remote data storage device 140 via network 134. The remote storage device may be a data storage device not located on the vehicle group, such as a data storage device located at a remotely located rail dispatch center. Communication system 150 includes communication devices of each vehicle of consist 100, such as communication device 120 on first vehicle 10 and communication device 220 on second vehicle 12. First data set 104 output by first data capture device 102 is transmitted from first vehicle 10 to one or more vehicles of consist 100, including second vehicle 12, via communication device 120 of communication system 150. Transmitted first data set 104 is received at second vehicle 12 via communication device 220 of communication system 150. The transmitted first data set 104 received at the second vehicle 12 may be broadcast on a display (not shown) in the second vehicle, such as, a display housed within a locomotive cab of the second vehicle 12. Communication device 120, 220 includes, for example, a wireless communication device 122 on the first vehicle 10, a wireless communication device 222 on the second vehicle 12, and multiple-unit lines 124. Still other devices may be possible, such as a satellite transceiver and a radio transceiver.

Wireless communication device 122, 222 dynamically establishes a wireless communication session with a wireless network, such as the wireless network 134 provided by the wireless access point 133 of a wayside device 130, to send and receive data communications between different vehicles of the consist 100. As consist 100 travels through different travel zones, the wireless communication device 122 detects different wireless network access points provided by wayside devices or other communication devices along the road track. In one example, a single wireless network covers a travel territory, and different wayside devices provide access points to the wireless network.

Multiple-unit (MU) lines 124 provide wired power connections between vehicles 10, 12 of the train system 100. In one example, the multiple-unit lines 124 (represented by thickened lines) include 27 pin cables that connect between each of the vehicles. The multiple-unit lines 124 supply 74 Volt, 1 Amp power to the vehicles. The power signal sent through the multiple-unit lines 124 is modulated to provide additional data communications capability. In one example, the power signal is modulated to generate a 10 MB/second information pipeline. Non-limiting examples of data communications passed through the multiple-unit lines 124 includes video data captured by a vehicle video device, travel information, vehicle state information, vehicle control commands, etc.

Wayside device 130 may embody different devices located along a road track. Non-limiting examples of wayside devices include signaling devices, switching devices, communication devices, etc. Wayside device 130 includes a remote computing system 132 configured to provide travel information to the train system 100. The wayside device 130 also includes the wireless access point 133 which allows the wireless communication devices 122, 222 on the different vehicles to connect to the wireless network 134.

A second controller is coupled to the second data capture device 202 for receiving the data set transmitted from the first vehicle 10. Second vehicle 12 further includes a second data storage device operable to store the first data set, or an alternate data set (such as the second data set). In some embodiments, as depicted, the second controller and the second data storage device of the second vehicle are configured into a single unit, herein second video unit 210. Second video unit 210 receives the transmitted first data set 104 at second vehicle 12 via communication device 220. Second video unit optionally evaluates one or more quality parameters of the received data set at the second vehicle. Based on the evaluation of the transmitted first data set 104, second video unit 210 either stores (that is, records) the first data set 104 or stores an alternate data set, such as second video data set 204 (dashed arrows) captured by second data capture device 202. For example, if the quality parameter of the first data set evaluated at the second vehicle is higher than a threshold, the first data is stored on the second vehicle. In comparison, if the quality parameter of the first data set is lower than the threshold, the first data is not stored on the second vehicle, and instead, the second data set is stored on the second vehicle. As such, the second data set 204 corresponds to native data captured at the second vehicle 12 by the second data capture device.

In the depicted example, second video unit 210 includes a video feed analysis module 212 configured to evaluate a quality parameter of the first data set 104, originating from the first data capture device 102 on-board the first vehicle 10, received at the second vehicle 12, and to further determine whether the evaluated quality parameter is higher than a threshold. Video feed analysis module 212 may include hardware and/or software configured to analyze the first data set 104 received at the second vehicle 12. In one embodiment, as elaborated in FIG. 3, video feed analysis module 212 evaluates the quality parameter of the transmitted first data set 104 based on, for example, a file size and/or frame variation of the transmitted data set. For example, the video feed analysis module 212 monitors the transmitted first data set over a predetermined duration, the duration based on a vehicle operating parameter, such as a vehicle speed or a vehicle's geographic location. If a variation in file size and/or frame (such as a point in the frame) of the transmitted first data set 104 over the predetermined duration exceeds a threshold amount, the module determines that the quality of the first data set is high and acceptable for storage on the second vehicle. Else, if the variation is less than the threshold, the module determines that the quality of the first data set is low, and not acceptable for storage on the second vehicle.

Second video unit 210 further includes a storage control module 214 configured to store the received first data set 104 in electronic storage if a quality parameter of the received first data set 104 is determined (by the video feed analysis module 212) to be higher than the threshold. If not, storage control module 214 stores the native second data set 204 originating from the second video device 202 on-board the second vehicle 12. Storage control module 214 may include hardware and/or software for storing the received first data set 104 and/or the native second data set 204 on second vehicle 12.

Video device control module 216 of second video unit 210 is configured to control the second data capture device 202 so that the second data capture device 202 generates the native second data set 204 only when the quality parameter of the first data set 104 received from the first vehicle is not higher than the threshold. Similarly, video device control module 216 is configured to avoid recording other data based on the evaluation. Video device control module 216 may include hardware and/or software for controlling the second data capture device 202.

In one embodiment, when the storage control module 214 stores first data set 104 received from the first vehicle 10, concomitantly, the transmitted first data set 104 is displayed on a display of the second vehicle 12. In comparison, when the storage control module 214 stores native second data set 204 captured by the second video device 202, concomitantly, the native second data set 204 is displayed on the display of the second vehicle.

While the depicted example shows the second data capture device coupled to a second video unit 210, in alternate embodiments, a second controller (e.g., on-board control system) may be coupled to the second data capture device 202, the controller including code for receiving the first data set transmitted by the first vehicle, code for evaluating a quality parameter of the first data set, and code for recording the transmitted first data set on the second vehicle (for example, on a dedicated second data storage device) while not recording other data (such as the native second data set), or recording the second data set (or an alternate data set) on the second vehicle, based on the evaluation.

Also, while the depicted embodiment illustrates off-boarding of the first data set from the first vehicle to the second vehicle in the vehicle group, this is not meant to be limiting, and in alternate embodiments, the first data set may be off-boarded to remote data storage device 140. As an example, during a condition when a link quality of communication system 150 is higher than a threshold, the first data set can be off-boarded to the remote storage location (e.g., at the dispatch center), while when the link quality is lower than the threshold, the first data set can be off-boarded to the second rail vehicle (and/or another rail vehicle of the consist).

Further, while the depicted embodiment illustrates transmission of the first data set from the first lead vehicle to the second remote vehicle, this is not meant to be limiting. In further embodiments, the first data set is similarly transmitted from the first lead vehicle to one or more remote vehicles in the vehicle consist, and redundantly stored on one or more or each of the remote vehicles based on the evaluation. Further still, in some embodiments, such as when the first data capture device on the first lead vehicle is not operative, or when there is insufficient data storage capacity on the second remote vehicle, data generated by a data capture device on a remote vehicle (such as second data set from the second remote vehicle) may be transmitted from the second vehicle to the first lead vehicle. In this way, at least some effectual data captured on the vehicle group can be redundantly stored.

FIG. 2 is a flow diagram of an example embodiment of a method 200 for transmitting and storing data captured on a vehicle group. As a non-limiting example, method 200 relates to transmission and storage of data generated on a first lead vehicle to one or more remote vehicles of a vehicle group. Method 200 can be performed by one or more modules of a first video unit 110 of first vehicle 10 and/or second video unit 210 of second vehicle 12, depicted in FIG. 1.

At 252, the method includes confirming that the first (herein, lead) vehicle is transmitting or streaming a first data set captured by the first data capture device. First data set may be transmitted from the first lead vehicle to a second remote vehicle (and/or other vehicles of the vehicle group) via a communication system including MU cables and/or wireless communication via a wayside device. In one example, a first controller coupled to the first data capture device of the first vehicle (or a first video feed analysis module of a first video unit on the first vehicle, as elaborated in FIG. 1) may be configured to evaluate a quality parameter of the first data set to determine if the first vehicle is streaming the first data. In another example, before transmitting the first data set, the first controller may be configured to evaluate a quality parameter of the first data set and initiate transmission of the first data set from the first vehicle only if, based on the evaluation (as elaborated in FIG. 3), it is determined that the quality parameter of the first data is higher than a threshold. In still other examples, the first data set is transmitted to the second vehicle without being evaluated before transmission (that is, the first data set may be transmitted as is). If no data is being transmitted or streamed to the second remote vehicle, the routine may end.

Upon confirmation of transmission, at 254, the routine includes evaluating one or more quality parameters of the first data set generated at the first vehicle. As elaborated in FIG. 3, this includes determining whether there is a variation in the first data set, and if so, whether the delta (that is, the variation) is higher than a threshold or not. For example, when a file size of the transmitted data set, or a point in a frame of the data set, varies more than a threshold amount over a predetermined duration, it is determined that the quality of the first data set is higher than a threshold and acceptable for off-boarding. In one example, the above-mentioned steps are performed at the second vehicle by a video feed analysis module of a video unit in the second vehicle.

At 256, the routine includes determining, based on the evaluation, if a quality of the transmitted video data is higher than a threshold or not. In one example, the evaluation is performed by the video feed analysis module of the second video unit on the second vehicle. If the quality of the first video data is higher than the threshold, then at 258, the routine includes off-boarding the first data set from the first vehicle to a data storage device (or video unit) on the second vehicle (and/or other vehicles of the vehicle group) for storage purposes. In alternate embodiments, the first data set may be off-boarded to a remote data storage device. As such, the transmitted video data may also be recorded on the first vehicle (e.g., on a storage module of a first video unit on the first vehicle) such that the first video data is recorded on the second vehicle as redundant storage.

In comparison, if the quality of the first video data is lower than the threshold, at 260, the routine includes not storing the first data set in the data storage device of the second vehicle, and instead, selecting another data set for storage on the second vehicle. For example, the second (native) data set output by the second data capture device of the second vehicle may be selected and stored on the data storage device of the second vehicle. In one example, the above mentioned steps of recording the transmitted first data set or the native second data set in a data storage device are performed by a storage control module of the second video unit on the second vehicle.

In one embodiment, when the storage control module of the video unit stores the first data set captured by the first data capture device and transmitted from the first vehicle, the transmitted first data set is concomitantly displayed on a display of the second vehicle. In comparison, when the storage control module stores native second data set captured by the second data capture device of the second vehicle, the native second data set is concomitantly displayed on the display of the second vehicle. During such a routine, a video device control module of the second video unit may be configured to control the second data capture device so as to ensure that the second data capture device generates the native second data set only when a quality parameter of the transmitted first data set received from the first vehicle is not high enough. The video device control module of the second video unit may also be configured to control the data storage device so as to ensure that the second data set is not stored when the first data set is being stored.

While the depicted embodiment illustrates transmission of the first data set from a first lead vehicle to a second remote vehicle, it will be appreciated that in alternate embodiments, the first data set captured by the first data capture device at the first lead vehicle may be transmitted to, and displayed on, one or more remote vehicles, each remote vehicle configured with respective data capture devices and video units. Thus, in the case of a vehicle group with multiple remote vehicles, if the data set transmitted from the lead vehicle is of a higher quality, the transmitted data set may be redundantly stored on one or more or each of the remote vehicles. In comparison, if the transmitted data is of a lower quality, each vehicle in the vehicle group may be configured to store native data captured by respective data capture devices on respective video units. In still another embodiment, if no data is being transmitted from the first lead vehicle (for example, due to the first data capture device of the first vehicle being inoperative, or due to limitations is storage capacity on the remote vehicle), and/or if the first data set is of a lower quality, data may be transmitted from a remote vehicle (such as the second vehicle) to the first lead vehicle and redundantly stored thereon.

Figure 3:
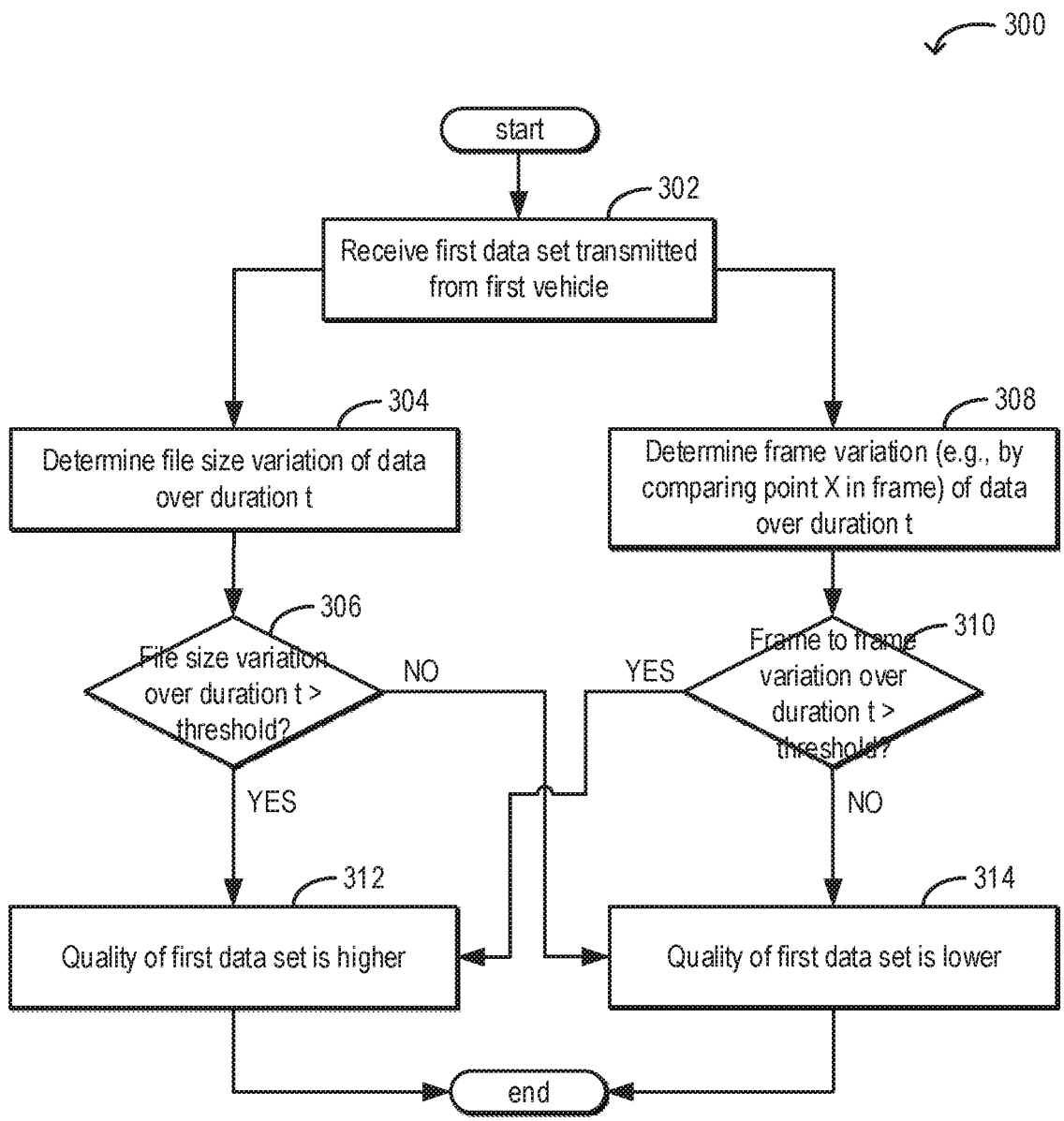
FIG. 3 shows a high level flow chart of a method for evaluating a quality parameter of the generated data.

FIG. 3 is a flow diagram of an example embodiment of a method 300 for evaluating one or more quality parameters of a data set captured by a data capture device on a first (e.g., lead) vehicle in a vehicle group and transmitted from the first vehicle to one or more remote vehicles of the vehicle group. In one example, one or more of the steps of method 300 are performed by one or more modules of second video unit 210 of second vehicle 12 and/or one or more modules of first video unit 110 of first vehicle 10 as depicted in FIG. 1.

At 302, the routine includes receiving the first data set transmitted from the first vehicle at the second vehicle. The quality of the transmitted first data set may then be evaluated (e.g., by the video feed analysis module of the second video unit of the second vehicle) based on, as non-limiting examples, file size variation and/or frame variation. In the depicted example, at 304, a file size (e.g., jpg file size) of the data set is monitored over a predetermined duration (t). The predetermined duration may be based on one or more operating parameters of the vehicle group including vehicle speed, configuration of vehicles in the vehicle group, vehicle position (e.g., geographic location), etc. In an alternate embodiment, the data set captured at the first data capture device is evaluated (e.g., by the video feed analysis module of the first video unit of the first vehicle) at the first vehicle before transmission there-from.

At 306, it is determined whether a variation in the file size of frames from the transmitted data set exceeds a threshold amount over the predetermined duration. As such, for a data set with a high quality of data feed, the file size will significantly vary. As one example, the file size of frames may vary from 200 KB to 250 KB and then to 220 KB over a duration. However, if all the frames are of the same file size, or are within a very small range of one another, for example, when the data set being streamed includes a blank screen, the data set may not include any useful information and may not be suitable for storage. Accordingly, at 312, if a change in a file size of the transmitted data set over the duration exceeds a threshold, the routine includes determining that the quality parameter of the transmitted data set is higher than a parameter threshold. In comparison, at 314, if a change in a file size of the transmitted data set over the duration does not exceed the threshold, the routine includes determining that the quality parameter of the transmitted data set is lower than a parameter threshold.

Additionally, or optionally, the transmitted data set may be evaluated based on frame variation. Herein, frames of the data set are compared to one another. This includes, at 308, monitoring and comparing a frame (e.g., a point X in the frame) of the data set over the predetermined duration. For example, a frame of the data set taken at a time point at the beginning of the predetermined duration (e.g., t1) is compared to a frame of the video data taken at a time point at the end of the predetermined duration (e.g., t2). At 310, the routine includes comparing the frames and determining whether frame to frame variation, over the duration, exceeds a threshold amount. Accordingly, at 312, if a frame variation of the transmitted data set over the duration exceeds a threshold, the routine includes determining that the quality parameter of the transmitted data set is higher than a parameter threshold. In comparison, at 314, if a frame variation of the transmitted data set over the duration does not exceed the threshold, the routine includes determining that the quality parameter of the transmitted data set is lower than a parameter threshold. In still other examples, the transmitted data set may be evaluated based on a stream quality, or a predefined "snapshot set" (that is, a subset of the full transmitted data set).

In a first example, data (e.g., video data) captured by a first data capture device of a first lead vehicle is stored on the first vehicle and transmitted, as is, to one or more remote vehicles, including a second (remote) vehicle. Upon receipt of the transmitted data set, a quality parameter of the received data set is evaluated (based on file size and/or frame size variation) at the second vehicle (and/or one or more remote vehicles). Based on the evaluation, specifically, if the quality parameter of the transmitted data set is determined to be higher than a threshold, the data set is off-boarded from the first vehicle and stored on the second vehicle (and/or one or more or each of the remote vehicles). If the quality parameter of the transmitted data set is determined to be lower than the threshold, then the transmitted data set is not off-boarded to, and stored on, the second vehicle (and one or more remote vehicles). Instead, native data captured at the second vehicle (and/or each remote vehicle) by respective data capture devices is stored on the respective vehicle.

In a second example, data captured by the first data capture device of the first (lead) vehicle is stored on the first vehicle and a quality parameter of the data set is evaluated (based on file size and/or frame size variation) at the first vehicle. If the quality parameter of the transmitted data set is determined to be higher than the threshold, the data set is transmitted to one or more remote vehicles, including the second vehicle. Upon receipt of the transmitted data set, the received data set is recorded, as is, on the second vehicle (and one or more or each remote vehicle). Herein, the received data set is recorded as transmitted from the first vehicle (that is, without further evaluation). If the quality parameter of the transmitted data set is determined to be lower than the threshold, then the data set is not off-boarded and transmitted from the first vehicle to the remote vehicles, and is only stored on the first vehicle. Optionally, data from a remote vehicle may be transmitted from the remote vehicle (e.g., second vehicle) to the first vehicle, and redundantly stored thereon. As such, native data captured at each remote vehicle by respective data capture devices may be stored on the respective vehicle.

In this way, the large volume of data captured on a vehicle of a vehicle group can be off-boarded from the vehicle on which it was captured, thereby reducing issues related to storage capacity. Furthermore, vital data captured on and transmitted from a lead vehicle of a vehicle group is recorded on one or more remote vehicles to ensure redundant storage only when the data is of an acceptable quality. As such, this ensures that a vehicle's memory storage is not occupied with ineffectual data. By storing native data captured by a data capture device of a remote vehicle when the quality of data generated at a lead vehicle is lower, storage of at least some effectual data is achieved.

Figure 4:
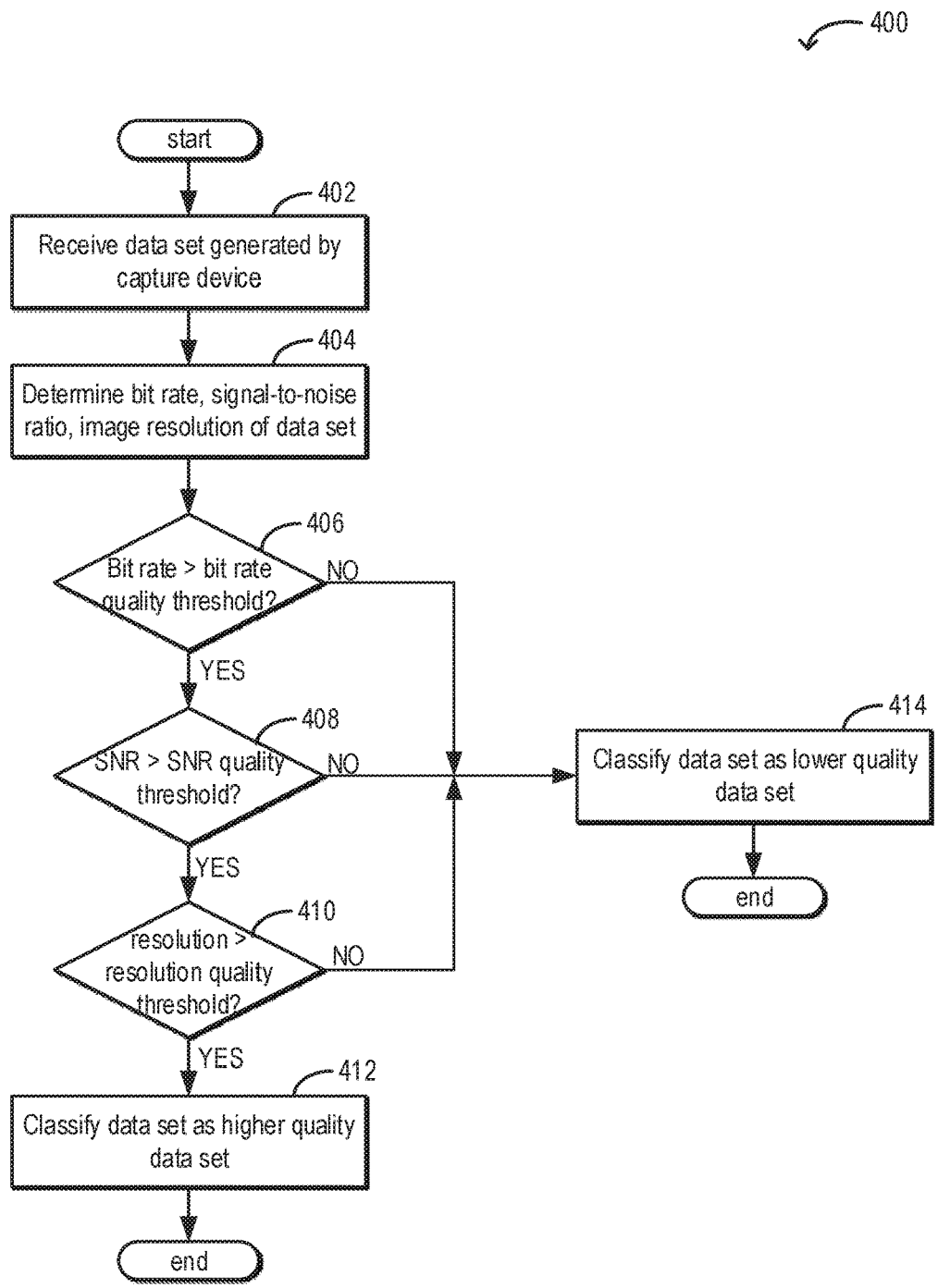
FIG. 4 shows a flow chart illustrating another method for evaluating a quality parameter of a generated data set.

FIG. 4 is a flow chart illustrating another example of a method 400 for evaluating one or more quality parameters of a data set captured by a data capture device on a first (e.g., lead) vehicle in a vehicle group. In one example, one or more of the steps of method 400 are performed by one or more modules of first video unit 110 of first vehicle 10 and/or one or more modules of second video unit 210 of second vehicle 12 as depicted in FIG. 1.

At 402, the routine includes receiving a data set generated by a capture device. The data set may be received at the first video unit 110 from one or more of the first data capture device 102 and third data capture device 103. The quality of the captured data set may then be evaluated (e.g., by the video feed analysis module of the first video unit of the first vehicle) based on, as non-limiting examples, bit rate, signal-to-noise ratio, and image resolution of the data set. In the depicted example, at 404, the bit rate, signal-to-noise ratio, and/or image resolution of the data set is determined. In some examples, all three of the bit rate, signal-to-noise ratio, and image resolution of the data set may be determined, while in other examples, only or a subset of three quality parameters may be determined. Further, in some examples the bit rate, signal-to-noise ratio, and/or image resolution may vary over the duration of the captured data set. As such, the bit rate, signal-to-noise ratio, and/or image resolution may be determined for each portion (e.g., frame or set of frames) of the data set.

The quality parameters are then evaluated to determine if the data set is of higher quality (e.g., if one or more of the quality parameters meets a predetermined condition relative to a quality threshold) or of lower quality (e.g., if one or more of the quality parameters does not meet the predetermined condition relative to the quality threshold). This may include, at 406, determining if the bit rate of the data set is greater than a bit rate quality threshold. The bit rate of the data set may be an average bit rate for the entire data set, or a plurality of bit rates may be determined. The bit rate represents the number of bits used per unit of playback time to represent a continuous medium (such as audio or video) after source coding, and thus is a quality parameter of the encoding of the raw data by the controller (e.g., video unit). If the bit rate is below a bit rate threshold (such as 128 kbs), it may indicate the encoded data set is of lower quality. In other examples, if the bit rate varies across the data set, it may indicate the data set if of lower quality. If it is determined at 406 that the bit rate is not above the quality threshold, method 400 proceeds to 414 to classify the data set as a lower quality data set.

If the bit rate is above the quality threshold, method 400 proceeds to 408 to determine if the signal-to-noise ratio (SNR) is above a SNR quality threshold. The SNR may indicate the level of background noise present in the data set, due to environmental conditions, a degraded data capture device, or other conditions. A low SNR ratio may make analysis of the captured data difficult. Thus, if the SNR ratio is relatively low (e.g., less than 1), it may indicate more noise than signal is present in the data set, and thus method 400 proceeds to 414 to classify the data set as a lower quality data set. In some examples, the average SNR may be determined for the data set and compared to the SNR threshold. In other examples, the SNR for each portion of the data set may be determined. In one example, if any portion of the data set has a SNR below the SNR threshold, the data set may be classified as lower quality. In another example, if more than a threshold portion of the data set has a SNR below the threshold (for example, if 20% of the data set has a SNR below threshold), the data set may be classified as lower quality.

If the SNR is above the SNR quality threshold, however, method 400 proceeds to 410 to determine if the resolution of the data (e.g., video) captured in the data set is equal to or above a resolution quality threshold, such 480p. If the data is not above the resolution threshold, method 400 proceeds to 414 to classify the data set as a lower quality data set. However, if the data resolution is at or above the resolution threshold, method 400 proceeds to 412 to classify the data set as a higher quality data set, then method 400 ends.

While method 400 explained above classifies the data set as being high quality if all the three quality parameters are met, such a configuration is not limiting, as other mechanisms for assessing data quality may be used. It is to be understood that not all quality parameters may be evaluated each time the quality of the data is assessed, for example. Thus, it is possible for the data set to be classified as higher quality even if only one or two of the quality parameters meet the respective quality parameter threshold outlined above. Further, some of the quality parameters may only apply to certain types of data. For example, the bit rate may only be determined for audio data, while the resolution may only be determined for video or image data.

Figure 5:
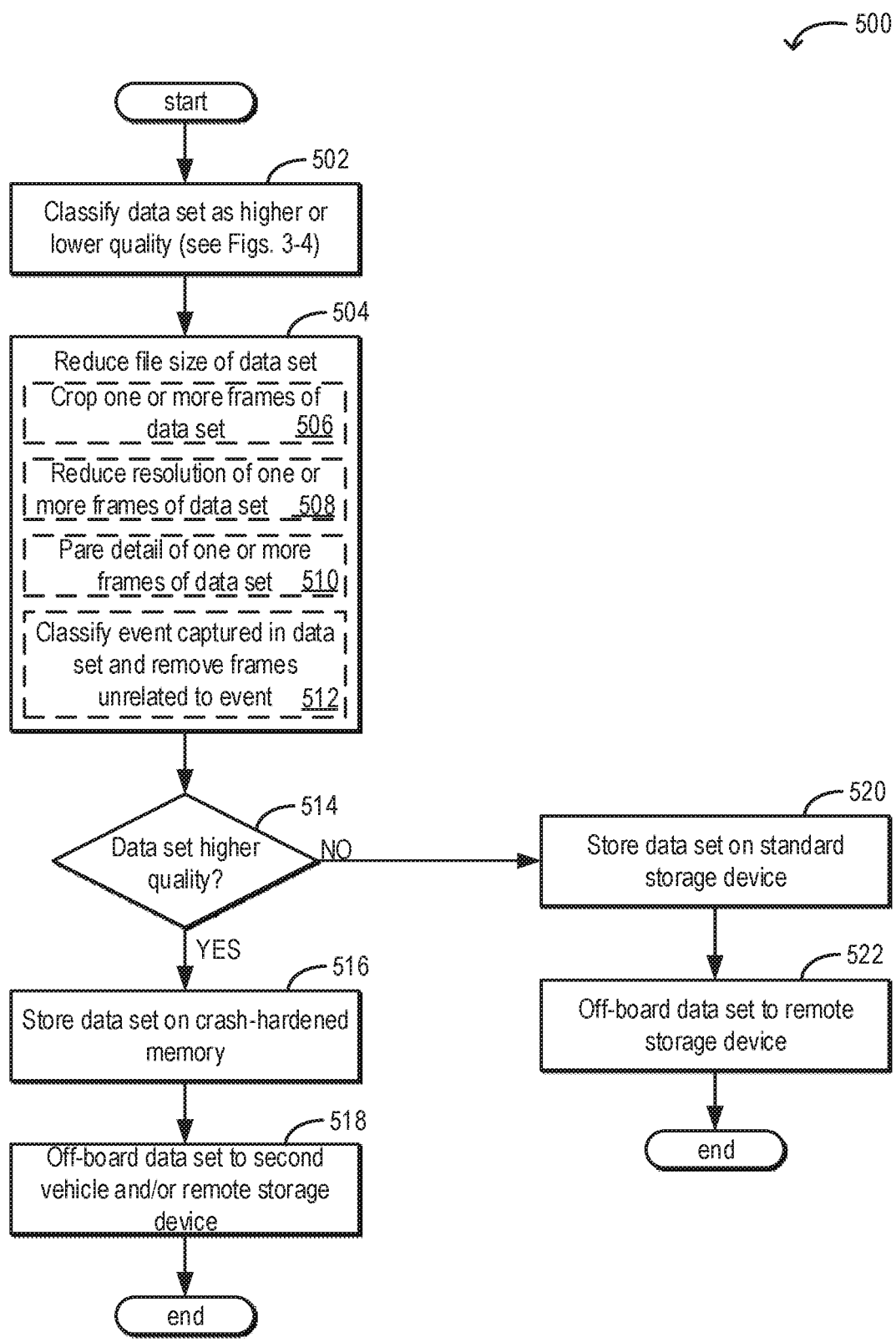
FIG. 5 shows a flow chart illustrating a method for managing data on a vehicle group.

Thus, once the quality of the captured, encoded, and/or transmitted data is evaluated, the data set may be selectively stored at one or more locations within the vehicle group or at a remote location, such as a wayside. FIG. 5 is a flow diagram of an embodiment of a method 500 for managing data captured on a vehicle group. As a non-limiting example, method 500 relates to file size reduction, transmission, and storage of data generated on a first lead vehicle to one or more remote vehicles of a vehicle group and/or one or more remote data storage devices. Method 500 may be performed by one or more modules of a first video unit 110 of first vehicle 10 and/or second video unit 210 of second vehicle 12, depicted in FIG. 1.

At 502, the captured data set is classified as higher or lower quality, as explained above with respect to FIGS. 3 and 4. At 504, the file size of the data set may be optionally reduced. As explained above, the data capture devices on the first and/or second vehicles may capture a large amount of data that may be difficult to store and/or transmit. As such, it may be desirable under some conditions to selectively reduce the file size of the data set to reduce the amount of space the data set may take up when stored and/or reduce the amount of data transmitted to the other vehicles in the vehicle group and remote storage devices, for example.

The file size may be selectively reduced so that desirable, important information captured in the data set is retained while less important information is discarded. In one example, as indicated at 506, reducing the file size may include cropping one or more frames of the data set. Cropping the frames may include deleting portions of the frames that do not include relevant information, such as the sky, trees, or other background in video frames captured by the data capture device. In another example, as indicated at 508, the resolution of one or more frames of the data set may be reduced. This may include reducing the resolution of all the frames of the data set, or reducing the resolution of select frames, for example frames that capture repetitive or redundant information. In a further example, reducing the file size may include paring the level of detail in at least a portion of one or more frames of the data set, as indicated at 510. As mentioned above, frames may include regions of less relevant information, such as the sky, and regions of more relevant information, such as the surface on which the vehicle group is traveling. To reduce the file size, one or more frames of the data set may have information from less relevant regions modified or removed. In one example, video frames of the data set that include the sky may be selectively pared by replacing the imaged sky with a generic simplified image of the sky. More specifically, if the imaged sky includes clouds, the sun or moon, airplanes, or other imaged details that are not germane to the eventual analysis that will be performed on the captured image, the sky may be pared down to a single color with no variation in order to reduce the file size of the data set.

In a still further example, the event captured by the data set may be identified, and any frames within the data set unrelated to the event may be removed, as indicated at 512. As explained previously, one type of event of interest that may be captured by the data capture devices includes the vehicle group (e.g., train consist) traversing a crossing (such as an intersection between the tracks on which the consist is traveling and an automotive highway). To ensure the consist traverses the crossing safely, warning alarms, crossing gates, switches, and/or other safety and navigation features may be activated when the consist approaches the crossing. The data capture devices may capture video, audio, and other information as the consist traverses the crossing that may be analyzed in order to perform a remote and automated crossing audit (e.g., an assessment of the performance of the crossing equipment without an engineer or other audit personnel present at the crossing).

Thus, in the above described example, the interval at which the consist approaches and traverses the crossing may be time stamped, and data captured before and after the actual crossing may be compressed or deleted. In this way, only the captured data relevant to the event of interest (e.g., traversing the crossing) may be stored or transmitted, thus saving storage space and reducing the amount of transmitted information.

The file size reduction performed at 504 may include one or more of the file size reduction techniques described at 506-512, or may include other mechanisms for reducing the file size not described. The file size reduction may be performed on all or only a subset of each generated data set. Further, in some examples, the file size reduction may be dispensed with.

At 514, it is determined if the data set was previously classified as a higher or lower quality data set. If the data set was classified as a higher quality data set, method 500 proceeds to 516 to store the data set on a crash-hardened memory. As explained above with respect to FIG. 1, the crash-hardened memory may reside on the first vehicle (e.g., lead vehicle) and be configured to store event information that can be used to assess conditions of the first vehicle and/or other vehicles in the group in the event of a crash of the vehicle group. As the crash-hardened memory may be smaller than other data storage devices residing on the first vehicle or remote from the first vehicle, it may be advantageous to selectively store only high quality data on the crash-hardened memory and/or only store data that has its file size reduced.

Further, in some examples, the data set may also be off-boarded at 518 to a second vehicle in the vehicle group and/or to a remote storage device, such as a storage device at a way station or control center, in order to provide redundant storage of the high-quality data.

Returning to 514, if it was determined that the data set in not of higher quality, method 500 proceeds to 520 to store the data set on a standard (e.g., non-crash hardened) storage device. The standard storage device may be a suitable memory that resides on the first vehicle, such as the storage device included in the storage control unit described above with respect to FIG. 1. In this way, the lower quality data may be stored on the first vehicle, but not stored on the crash-hardened memory, thus leaving valuable space on the crash-hardened memory. Additionally or alternatively, the lower quality data set may be off-boarded at 522 to a remote storage device (e.g., a storage device located remotely from the vehicle group). Method 500 then ends.

Thus, method 500 described above may reduce the file size of a data set and selectively store the data set on one or more storage devices both on and off the first vehicle. While method 500 chooses where to store the data set based on the quality of the data set, other parameters may also be considered when choosing where to store the data set. For example, the quality of the communication link between the vehicles in the vehicle group and/or between the first vehicle and a remote control system (that may include the remote storage device) may be assessed (based on a packet loss rate, for example), and if the communication link quality is below a threshold, the data set may be stored on the first vehicle and not off-boarded until the communication link quality improves. In other example, the data set may be off-boarded to the second vehicle over a wired communication link, and only off-boarded to the remote storage device when the communication link between the first vehicle and remote control system is of sufficient quality.

An embodiment relates to a method of processing data. The method includes generating a first data set on a first vehicle in a vehicle group, evaluating a quality parameter of the first data set, and, based on the evaluation, off-boarding the first data set for storage purposes. The quality parameter is evaluated by estimating a file size variation of the first data set and/or a frame variation of the first data set over a time duration, and determining if the file size variation or frame size variation exceeds a parameter threshold. If the quality parameter of the first data set is higher than a quality threshold (e.g., if the file size variation or frame size variation exceeds the parameter threshold at all, or if the file size variation or frame size variation exceeds the parameter threshold by a certain amount or degree), then the first data set is off-boarded by transmitting the first data set from the first vehicle to a second vehicle of the vehicle group over a communication system of the vehicle group, and storing the transmitted first data set on the second vehicle. If the quality parameter of the first data set is lower than the quality threshold, the first data set is not transmitted from the first vehicle.

In an embodiment, a method comprises generating a first data set on a first vehicle in a vehicle group, storing the first data set, evaluating a quality parameter of the first data set, and processing the first data set according to the evaluation. In a first mode of processing, selected as a function of the evaluation, the first data set is erased. In a second mode of processing, selected as a function of the evaluation, the first data set is either left alone as stored, transferred to other storage (than where currently stored), and/or consolidated with other data. (In this context, "processing" includes potentially acting upon based upon an evaluation.) The quality parameter of the first data set is evaluated by estimating a file size variation of the first data set and/or a frame variation of the first data set over a duration (time period), and determining if the file size variation or frame size variation exceeds a designated threshold. If the file size variation or frame size variation does not exceed the designated threshold, the first data set is processed in the first mode of processing, for erasure. If the file size variation or frame size variation exceeds the designated threshold, the first data set is processed in the second mode of processing. (These steps can be carried out on the first vehicle alone, or across plural vehicles of the vehicle group. For example, in an embodiment, the first data set is generated on the first vehicle, but then transmitted to a second vehicle in the group for storage, evaluation, and processing in the first mode or the second mode, as a function of the evaluation.)

Unless otherwise specified (such as in the claims), embodiments of the invention are applicable to vehicles generally, and/or to vehicles with diesel engines. Thus, any instances of "locomotive" herein refer more generally to a vehicle or other vehicle, unless otherwise specified. The term "lead" vehicle as used herein refers to a vehicle designated for primary control of a vehicle consist, and not necessarily to the first vehicle in the consist. However, in some operational modes, the lead vehicle may be the first vehicle in the vehicle consist. "Remote" or "trail" vehicle as used herein refers to a vehicle set to take a subordinate role in consist control, e.g., a remote vehicle controlled based on control signals received from the lead vehicle, such as in distributed power operations.

An embodiment relates to a method of processing data in a vehicle group, comprising selectively off-boarding a data set generated at a first vehicle in the vehicle group for storage purposes, the first data set off-boarded to one or more of a second vehicle in the vehicle group and a remote storage device. The vehicle group includes a communication system configured to communicatively couple the first vehicle to other vehicles in the vehicle group, the communication system further configured to communicatively couple the vehicle group to the remote storage device. Off-boarding the data set for storage purposes includes, during a first condition, off-boarding the data set from the first vehicle to the second vehicle in the vehicle group via the communication system; and during a second condition, off-boarding the data set from the first vehicle to the remote storage device via the communication system.

The communication system may be linked to a network, and the first condition may include a link quality of the communication system being lower than a threshold, and the second condition may include the link quality of the communication system being higher than the threshold.

The method includes evaluating a level of quality of the data set. The first condition may include the level of quality of the data set being above a threshold level, and the second condition may include the level of quality of the data set being below the threshold level.

The level of quality of the data set may comprise one or more of a bit rate, a signal to noise ratio, a resolution, and a packet loss rate of the data set. The data set includes audio and video data generated by a data capture device of the first vehicle, the data capture device including at least an inward facing camera to capture data inside the first vehicle and an outward facing camera to capture data outside the first vehicle.

In an embodiment, a method of processing data comprises generating a data set on a first vehicle in a vehicle group;

evaluating a quality parameter of the data set; if the quality parameter is below a quality threshold, storing the data set in a standard data storage device; and if the quality parameter is above the quality threshold, storing the data set in a crash-hardened memory on the first vehicle.

The method further comprises if the quality parameter is above the threshold level, off-boarding the data set for storage purposes. The quality parameter of the data set may be evaluated at the first vehicle, and off-boarding the data set includes transmitting the data set from the first vehicle to a second vehicle of the vehicle group over a communication system of the vehicle group, and storing the transmitted data set on the second vehicle.

The data set may be a first data set, and the method further comprises generating a second data set on the second vehicle, and if the quality parameter of the first data set is lower than the threshold, storing the second data set on the second vehicle.

In an example, storing the data set in a standard data storage device comprises storing the data set in a standard data storage device located on the first vehicle. In another example, storing the data set in a standard data storage device comprises storing the data set in a standard data storage device located remotely from the first vehicle.

The method further comprises, after generating the data set and before storing the data set, reducing a file size of the data set. Reducing the file size of the data set comprises one or more of cropping one or more frames of the data set, reducing a resolution of one or more frames of the data set, and selectively lowering a level of detail of one or more frames of the data set.

Another embodiment includes a system, comprising: a vehicle group including at least a first vehicle coupled to a second vehicle; a data capture device associated with the first vehicle; and a controller coupled to the data capture device. The controller is configured to evaluate a quality parameter of a data set generated by the data capture device; and based on the evaluation, initiate recording of the data set on a data storage device located on the first vehicle and initiate transmission of the data set off-board the first vehicle to a the second vehicle.

The data storage device may be one or more of a crash-hardened memory and a standard data storage device. The system further comprises a communication system configured to communicatively couple the first vehicle to other vehicles in the vehicle group, the communication system further configured to communicatively couple the vehicle group to a remote storage device. The data capture device may comprise at least one of an inward-facing camera, an outward-facing camera, and a microphone.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. A method of processing data in a vehicle consist, comprising:
   determining, via an electronic controller, a level of quality of a data set captured by a data capture device of a first vehicle of the vehicle consist, the level of quality determined based on two or more of a resolution, a bit rate, and a signal-to-noise ratio of the data set;
   when the level of quality of the data set is higher than a threshold level, storing the data set in a first memory on the first vehicle;
   when the level of quality of the data set is not higher than the threshold level, storing the data set in a second memory on the first vehicle, the second memory separate from the first memory; and
   selectively off-boarding the data set for storage purposes via the electronic controller, the data set off-boarded to one or more of a second vehicle of the vehicle consist or a remote storage device offboard the vehicle consist based on the determined level of quality.

2. The method of claim 1, wherein the vehicle consist includes a communication system configured to communicatively couple the first vehicle to other vehicles in the vehicle consist, the communication system further configured to communicatively couple the vehicle consist to the remote storage device, wherein off-boarding the data set for storage purposes includes,
   during a first condition, off-boarding the data set from the first vehicle to the second vehicle in the vehicle consist via the communication system; and
   during a second condition, off-boarding the data set from the first vehicle to the remote storage device via the communication system.

3. The method of claim 2, wherein the communication system is linked to a network, and wherein the first condition includes a link quality of the communication system being lower than a threshold, and wherein the second condition includes the link quality of the communication system being higher than the threshold.

4. The method of claim 2, wherein the first condition includes the level of quality of the data set being above the threshold level, wherein the second condition includes the level of quality of the data set being below the threshold level, and wherein the level of quality of the data set is further determined based on a resolution of the data set.

5. The method of claim 1, further comprising reducing a file size of the data set by selectively lowering a level of detail of one or more frames of the data set, and wherein the vehicle consist is a train, the first vehicle is a first locomotive of the train, and the second vehicle is a second locomotive of the train.

6. The method of claim 1, wherein the data set includes audio and video data generated by the data capture device of the first vehicle, the data capture device including at least an inward facing camera to capture data inside the first vehicle and an outward facing camera to capture data outside the first vehicle, and wherein the level of quality of the audio data is determined based on the bit rate and the level of quality of the video data is determined based on the resolution and the signal-to-noise ratio.

7. A method, comprising:
   generating a first data set on a first vehicle of a vehicle consist, the first data set captured by a first data capture device of the first vehicle;
   evaluating, via an electronic controller, a resolution of the first data set;

responsive to the resolution being below a quality threshold, capturing a second data set with a second data capture device of a second vehicle of the vehicle consist and storing the second data set on the second vehicle;

responsive to the resolution being above the quality threshold, storing the first data set in a crash-hardened memory on the first vehicle; and after generating the first data set and before storing the first data set, reducing a file size of the first data set, via the electronic controller, by identifying background features in one or more frames of the first data set and replacing the identified background features with a simplified version of the identified background features.

8. The method of claim 7, further comprising, if the resolution is above the quality threshold, off-boarding the first data set for storage purposes, and, when the resolution is below the quality threshold, storing the first data set in a standard data storage device of the first vehicle.

9. The method of claim 8, wherein the resolution of the first data set is evaluated at the first vehicle, wherein off-boarding the first data set includes transmitting the first data set from the first vehicle to the second vehicle over a communication system of the vehicle consist and storing the transmitted first data set on the second vehicle, and wherein, when the resolution of the first data set is above the quality threshold, not capturing the second data set with the second data capture device.

10. The method of claim 7, wherein the first vehicle is a first locomotive and the second vehicle is a second locomotive.

11. The method of claim 7, wherein reducing the file size of the first data set further comprises cropping one or more frames of the first data set.

* * * * *